(12) United States Patent
Zhou

(10) Patent No.: US 11,785,552 B2
(45) Date of Patent: Oct. 10, 2023

(54) METHOD AND APPARATUS FOR ADJUSTING UPLINK TRANSMISSION POWER OF TERMINAL, AND STORAGE MEDIUM

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/266,814

(22) PCT Filed: Aug. 10, 2018

(86) PCT No.: PCT/CN2018/100085
§ 371 (c)(1),
(2) Date: Feb. 8, 2021

(87) PCT Pub. No.: WO2020/029294
PCT Pub. Date: Feb. 13, 2020

(65) Prior Publication Data
US 2021/0345254 A1    Nov. 4, 2021

(51) Int. Cl.
*H04W 52/14* (2009.01)
*H04W 8/24* (2009.01)
*H04W 52/36* (2009.01)

(52) U.S. Cl.
CPC .......... *H04W 52/146* (2013.01); *H04W 8/24* (2013.01); *H04W 52/367* (2013.01)

(58) Field of Classification Search
CPC ......... H04W 52/00–60; H04W 52/146; H04W 52/367; H04W 8/24
See application file for complete search history.

(56) References Cited

U.S. PATENT DOCUMENTS 10,574,707 B1 * 2/2020 Norquist ............. H04L 65/1104
2010/0238892 A1 * 9/2010 Dahlman ............ H04W 52/286
370/329

(Continued)

FOREIGN PATENT DOCUMENTS

CN    103975633 A    8/2014
CN    108271175 A    7/2018

(Continued)

OTHER PUBLICATIONS

Office Action dated Feb. 3, 2022, from the Intellectual Property of India issued in counterpart Indian Application No. 202147009832.

(Continued)

*Primary Examiner* — Raymond S Dean
(74) *Attorney, Agent, or Firm* — Finnegan, Henderson, Farabow, Garrett & Dunner, L.L.P.

(57) ABSTRACT

The present invention relates to a method and apparatus for adjusting uplink transmission power of a terminal and a storage medium. The method includes: receiving sending capability information of at least one antenna module of a terminal; obtaining a target uplink transmission power of the terminal according to the sending capability information; and notifying the terminal of the target uplink transmit power. The method can improve the data transmission efficiency of a terminal, or reduce the power consumption of the terminal on the premise of ensuring the data transmission efficiency of the terminal.

13 Claims, 12 Drawing Sheets

(56) References Cited

U.S. PATENT DOCUMENTS

| | | | |
|---|---|---|---|
| 2013/0089044 A1 | 4/2013 | Park et al. | |
| 2016/0226570 A1* | 8/2016 | Nicholls | H04B 7/0897 |
| 2017/0325174 A1* | 11/2017 | Dinan | H04W 52/146 |
| 2018/0049140 A1* | 2/2018 | Hirsbrunner | H04L 43/16 |
| 2018/0332541 A1* | 11/2018 | Liu | H04W 52/10 |
| 2018/0368075 A1* | 12/2018 | Chen | H04W 52/42 |
| 2019/0190747 A1* | 6/2019 | Park | H04B 7/0486 |

FOREIGN PATENT DOCUMENTS

| | | |
|---|---|---|
| WO | WO 2017/196612 A1 | 11/2017 |
| WO | WO 2018/126930 A1 | 7/2018 |

OTHER PUBLICATIONS

Extended European Search Report dated Mar. 4, 2022, from the European Patent Office issued in European Application No. 18929817.7.

Huawei, HiSilicon, "Discussion of RAN4 LSs on Power Control", 3GPP TSG RAN WG1 Meeting NR Ad-hoc #3, R1-1715595, Nagoya, Japan, Sep. 18-21, 2017, 3 pages.

\* cited by examiner

METHOD AND APPARATUS FOR ADJUSTING UPLINK TRANSMISSION POWER OF TERMINAL, AND STORAGE MEDIUM

CROSS REFERENCE TO RELATED APPLICATIONS

This application is a national phase application based on International Application No. PCT/CN2018/100085, filed Aug. 10, 2018, the content of which is incorporated herein by reference.

TECHNICAL FIELD

The present disclosure relates to a field of communication technologies, and more particularly to a method and an apparatus for adjusting an uplink transmission power of a terminal, and a storage medium.

BACKGROUND

In the related art, an uplink transmission power of a terminal is mainly implemented based on measurement and feedback of a reference signal by the terminal. For example, the terminal feeds back a measured strength of a reference signal transmitted by a base station to the base station, and then the base station determines the uplink transmission power required by the terminal.

SUMMARY

According to a first aspect of the present disclosure, there is provided a method for adjusting an uplink transmission power of a terminal. The method is applied to a base station. The method includes: receiving sending capability information of at least one antenna module of the terminal; obtaining a target uplink transmission power of the terminal based on the sending capability information; and notifying the terminal of the target uplink transmission power.

According to a second aspect of the present disclosure, there is provided a method for adjusting an uplink transmission power of a terminal, which is applied to the terminal. The method includes: sending sending capability information of at least one antenna module of the terminal to a base station; and receiving a target uplink transmission power sent by the base station, the target uplink transmission power being obtained by the base station based on the sending capability information.

According to a fifth third aspect of the present disclosure, there is provided a base station. The base station includes: a processor and a memory configured to store instructions executable by the processor. The processor is configured to: receive sending capability information of at least one antenna module of the terminal; obtain a target uplink transmission power of the terminal based on the sending capability information; and notify the terminal of the target uplink transmission power.

According to a fourth aspect of the present disclosure, there is provided a terminal. The terminal includes: a processor and a memory configured to store instructions executable by the processor. The processor is configured to: transmit, to a base station, sending capability information of at least one antenna module of the terminal to a base; and receive a target uplink transmission power sent by the base station, the target uplink transmission power being obtained by the base station based on the sending capability information.

The technical solution provided by embodiments of the present disclosure may include following advantageous effects.

With the method for adjusting the uplink transmission power of the terminal of embodiments, the target uplink transmission power of the terminal is determined based on the sending capability information of the at least one antenna module of the terminal, and the target uplink transmission power is notified to the terminal, such that the terminal transmits a signal with the target uplink transmission power. In this way, a purpose of controlling the uplink transmission power of the terminal based on an actual transmission capability of the terminal is achieved, which may improve a data transmission efficiency of the terminal or save a power consumption of the terminal on the premise of ensuring the data transmission efficiency of the terminal.

It is to be understood that both the foregoing general description and the following detailed description are exemplary and explanatory only, and are not restrictive of the present disclosure.

BRIEF DESCRIPTION OF THE DRAWINGS

The accompanying drawings, which are incorporated in and constitute a part of this specification, illustrate embodiments consistent with the present disclosure, and serve to explain the principle of the present disclosure together with the specification.

DETAILED DESCRIPTION

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Figure 1:
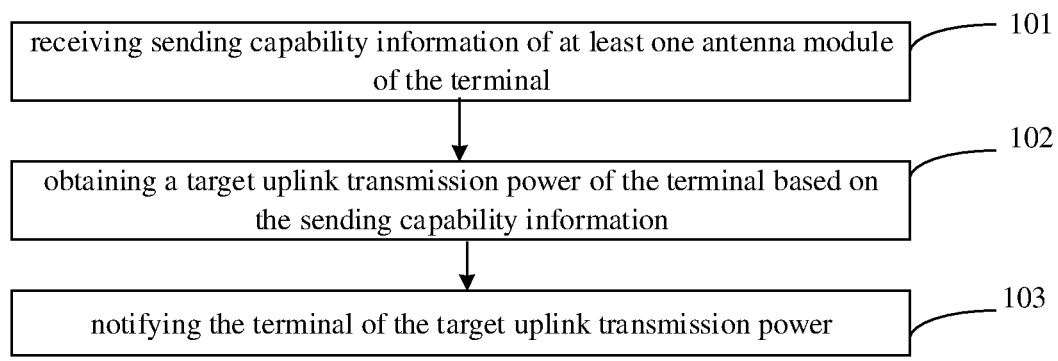
FIG. 1 is a flow chart illustrating a method for adjusting an uplink transmission power of a terminal according to an exemplary embodiment of the present disclosure.

FIG. 1 is a flow chart illustrating a method for adjusting an uplink transmission power of a terminal according to an exemplary embodiment of the present disclosure. The method is applied to a base station, that is, the method may be executed by the base station. As illustrated in FIG. 1, the method includes the following.

At step 101, sending capability information of at least one antenna module of the terminal is received.

In a possible implementation, the sending capability information of the at least one antenna module of the terminal received by the base station may include sending capability information of a physical antenna module, a virtual antenna module or an antenna module combination of the terminal. The sending capability information may also include at least one of an identifier of the physical antenna module, an identifier of the virtual antenna module, and an identifier of the antenna module combination.

At step 102, a target uplink transmission power of the terminal is obtained based on the sending capability information of the at least one antenna module of the terminal.

Description will be made below to the method for calculating the uplink transmission power of the terminal based on a method for calculating an uplink transmission power of the terminal in the i-th subframe on a physical uplink shared channel (PUSCH). The target uplink transmission power may be obtained by increasing or reducing an uplink transmission power calculated based on a following formula, or obtained by increasing or reducing at least one parameter in the following formula and utilizing the at least one increased or reduced parameter.

A transmission power $P_{PUSCH}(i)$ of the terminal in the i-th subframe on the PUSCH may be obtained by:

$$P_{PUSCH}(i)=\min\{P_{CMAX}, 10\log_{10}(M_{PUSCH}(i))+P_{O\_PUSCH}(j)+\alpha(j)\times PL+\Delta_{TF}(i)+f(i)\}.$$

In the formula, $P_{CMAX}$ represents a maximum transmission power of the terminal, and $M_{PUSCH}(i)$ represents the number of resource blocks (RB) used in a PUSCH transmission in the i-th subframe.

In the formula, $P_{O\_PUSCH}(j)=P_{O\_NOMINAL\_PUSCH}(j)+P_{O\_UE\_PUSCH}(j)$ represents a semi-static setting power reference value. $P_{O\_NOMINAL\_PUSCH}(j)$ represents a cell-specific parameter, which is related to a cell covered by the antenna module of the terminal. $P_{O\_UE\_PUSCH}(j)$ represents a terminal-specific parameter, which may be set with different values for different uplink transmission data packets. $P_{O\_NOMINAL\_PUSCH}(j)$ and $P_{O\_UE\_PUSCH}(j)$ may be indicated by a high layer signaling. In addition, the parameter j is related to the upstream transmission data packet, that is, j=0 when a semi-persistent data packet is transmitted; j=1 when a data packet with a dynamic scheduling permission is transmitted; and j=2 when a data packet randomly accessing a response permission is transmitted.

In the formula, $\alpha(j)$ represents a compensation amount of a path loss corresponding to the cell, and $\alpha(j)$ may be indicated by the high layer signaling. $\alpha(j)$ takes a value in {0, 0.4, 0.5, 0.6, 0.7, 0.8, 0.9, 1} when j=0 or j=1, and $\alpha(j)$=1 when j=2. $\alpha(j)$ may also be referred to herein as a cell path compensation value since $\alpha(j)$ is related to the cell covered by the antenna module of the terminal.

In the formula, PL represents a loss compensation value of an open loop path obtained based on an estimation for a downlink by the terminal.

In the formula, $\Delta_{TF}(i)$ represents a power adjustment value based on a modulation and coding scheme (MCS). Based on power adjustment for the MCS, a corresponding transmission power spectral density may be dynamically adjusted by the terminal according to a selected MCS. The MCS of the terminal is scheduled by the base station. The transmission power spectral density of the terminal may be quickly adjusted by setting a transmission MCS of the terminal, which may achieve an effect of quickly controlling the transmission power of the terminal.

In the formula, f(i) represents an adjustment value of a current power control of the PUSCH, which may be referred as a power adjustment value of the PUSCH. The power adjustment value of the PUSCH may be adjusted based on a transmitter power control (TPC) command on the PUSCH, and a detailed adjustment mode may be found in rule of 3GPP TS36.213.

The above transmission power of the terminal may be a conducted transmission power of the terminal, and a power radiated to a space (referred as a space radiation power) may have a certain loss.

At step 103, the terminal is notified of the target uplink transmission power.

In a possible implementation, the base station may inform the terminal of the target uplink transmission power by sending a control signaling to the terminal. The control signaling may be, such as, any one of: a radio resource control (RRC) signaling, a media access control (MAC) control element (CE) signaling or a physical layer signaling. The control signaling may include an identifier of the terminal and the target uplink transmission power.

With the method for adjusting the uplink transmission power of the terminal of embodiments, the target uplink transmission power of the terminal is determined based on the sending capability information of the at least one antenna module of the terminal, and the target uplink transmission power is notified to the terminal, such that the terminal transmits a signal with the target uplink transmission power. In this way, a purpose of controlling the uplink transmission power of the terminal based on an actual transmission capability of the terminal is achieved, which may improve a data transmission efficiency of the terminal or save a power consumption of the terminal on the premise of ensuring the data transmission efficiency of the terminal.

In a possible implementation, the sending capability information of the at least one of antenna module of the terminal includes at least one sending capability index. The at least one sending capability index may be a peak value of an effective isotropic radiated power (EIRP), an average value of the EIRP, a minimum value of the EIRP, an average value of a total radiated power (TRP), and a minimum value of the TRP. For example, the sending capability indexes of the antenna module may be preset on the terminal before leaving the factory. The sending capability information of the at least one antenna module sent by the terminal and received by the base station may include an identifier of at least one antenna module, an identifier of at least one sending capability index of the at least one antenna module, and a value corresponding to the sending capability index. The sending capability information may also include an identifier of at least one antenna module combination, the identifier of the at least one sending capability index of the at least one antenna module, and the value corresponding to the sending capability index.

Figure 2:
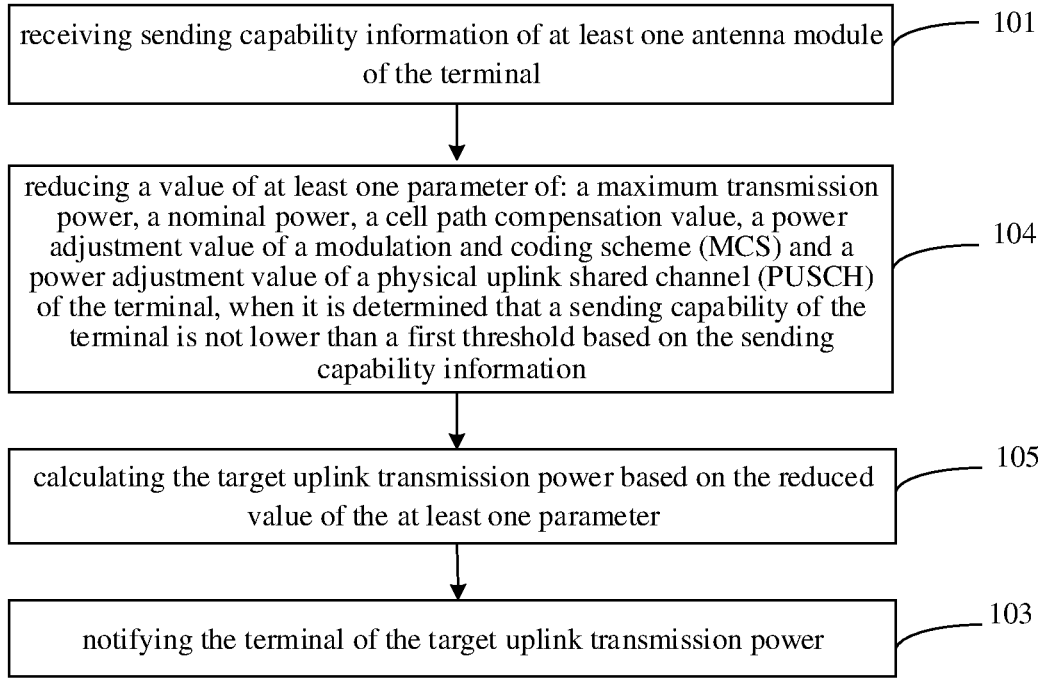
FIG. 2 is a flow chart illustrating a method for adjusting an uplink transmission power of a terminal according to an exemplary embodiment of the present disclosure.

FIG. 2 is a flow chart illustrating a method for adjusting an uplink transmission power of a terminal according to an exemplary embodiment of the present disclosure. As illustrated in FIG. 2, in the method, obtaining the target uplink transmission power of the terminal based on the sending capability information of the at least one antenna module of the terminal includes steps 104 and 105. At step 104, a value of at least one parameter of: a maximum transmission power, a nominal power, a cell path compensation value, a power adjustment value of a MCS and a power adjustment value of a PUSCH of the terminal is reduced, when it is determined that a sending capability of the terminal is not lower than a first threshold based on the sending capability information of the at least one antenna module of the terminal. A preset value may be subtracted from the at least one parameter, or the at least one parameter may be multiplied by a preset coefficient greater than 0 and less than 1 when the value of the at least one parameter is reduced. Reducing the maximum transmission power $P_{CMAX}$ of the terminal is taken as an example. A reduced $P_{CMAX}$ may be $P_{CMAX} - \Delta P_{CMAX}(V\_x \overline{FP})$, where $V\_x \overline{FP}$ represents a value of a sending capability of the at least one antenna module of the terminal. For example, $V\_x \overline{FP}$ may be one of the peak value of the EIRP, the average value of the EIRP, the minimum value of the EIRP, the average value of the TRP, and the minimum value of the TRP. The greater the value of $V\_x \overline{FP}$, the stronger the sending capability of the terminal. A value of $\Delta P_{CMAX}(V\_x \overline{FP})$ may be increased with increasing a value of $V\_x \overline{FP}$, that is, the value of $\Delta P_{CMAX}(V\_x \overline{FP})$ is positively correlated with the value of $V\_x \overline{FP}$. The reduced value of $P_{CMAX}$ may also be $P_{CMAX} \times \beta P_{CMAX}(V\_x \overline{FP})$. A value of $\beta P_{CMAX}(V\_x \overline{FP})$ is reduced with increasing the value of $V\_x \overline{FP}$, that is, the value of $\beta P_{CMAX}(V\_x \overline{FP})$ is negatively correlated with the value of $V\_x \overline{FP}$. At step 105, the target uplink transmission power is calculated based on the at least one reduced parameter. For example, the target uplink transmission power may be obtained by substituting the at least one reduced parameter into the above formula.

In a possible implementation, the sending capability of the terminal may be calculated based on the at least one sending capability index of the at least one antenna module of the terminal. The sending capability of the terminal may be a sum of the sending capabilities of all physical antenna modules of the terminal. The average value of the TRP of the at least one antenna module of the terminal is taken as an example. It is assumed that the terminal includes two antenna modules which are an antenna module 1 and an antenna module 2. An average value of a TRP of the antenna module 1 is 12 dBm, an average value of a TRP of the antenna module 2 is 10 dBm, and the sending ability of the terminal is 22 dBm.

In a possible implementation, the sending capability of the terminal may also be determined based on weight values of at least two sending capability indexes of the at least one antenna module of the terminal. The weight value is obtained by superimposing a weight value on each of the at least two sending capability indexes, and summing the at least two sending capability indexes after superimposing the weight values. The peak value of the EIRP and the minimum value of the TRP of the antenna module are taken as an example to calculate the sending capability of the terminal. It is assumed that the terminal includes the antenna module 1 and the antenna module 2. A peak value of an EIRP of the antenna module 1 is 14 dBm, and a minimum value of a TRP of the antenna module 1 is 8 dBm. A peak value of an EIRP of the antenna module 2 is 0.4, and a minimum value of a TRP of the antenna module 2 is 9 dBm. A weight value corresponding to the peak value of the EIRP is 0.4, and a weight value corresponding to the minimum value of the TRP is 0.6. Therefore, the sending capability of the terminal is (14×0.4+8×0.6)+(13×0.4+9×0.6)=21 dBm.

Figure 3:
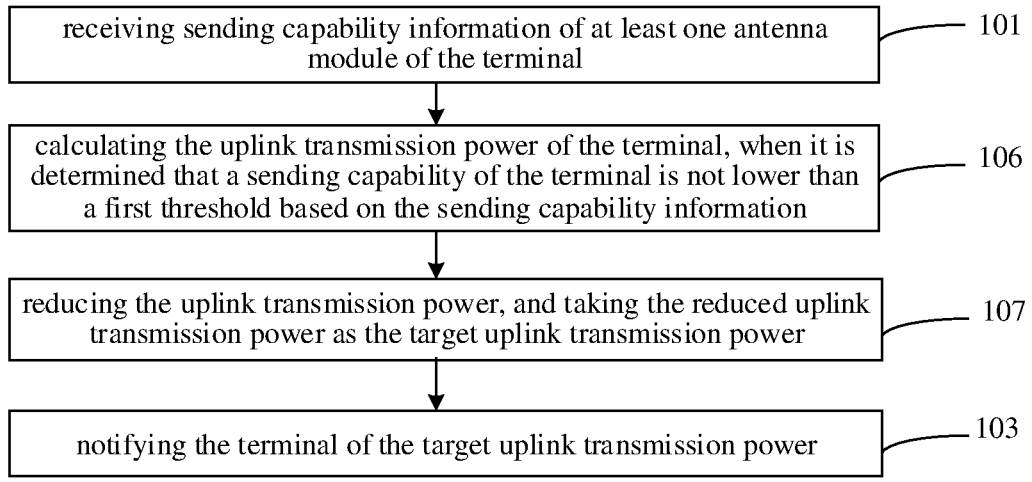
FIG. 3 is a flow chart illustrating a method for adjusting an uplink transmission power of a terminal according to an exemplary embodiment of the present disclosure.

FIG. 3 is a flow chart illustrating a method for adjusting an uplink transmission power of a terminal according to an exemplary embodiment of the present disclosure. As illustrated in FIG. 3, in the method, obtaining the target uplink transmission power of the terminal based on the sending capability information of the at least one antenna module of the terminal may include: at step 106, calculating the uplink transmission power of the terminal, when it is determined that a sending capability of the terminal is not lower than a first threshold based on the sending capability information of the at least one antenna module of the terminal; and at step 107, reducing the uplink transmission power, and taking the reduced uplink transmission power as the target uplink transmission power. The reduce uplink transmission power may be a value obtained by subtracting a preset value from the calculated uplink transmission power, or multiplying the calculated uplink power value by a preset coefficient greater than 0 and less than 1. For example, the uplink transmission power $P_{PUSCH}(i)$ of the terminal may be reduced to $P_{PUSCH}(i) - \Delta(V\_xRP)_1$ or $P_{PUSCH}(i) \times \beta(V\_xRP)$ by adjusting a factor $\Delta(V\_xRP)_1$ or a factor $\beta(V\_xRP)_1$. A value of $\Delta(V\_xRP)_1$ may be increased with increasing the value of $V\_x \overline{FP}$, that is, the value of $\Delta(V\_xRP)_1$ is positively correlated with the value of $V\_x \overline{FP}$. A value of $\beta(V\_xRP)_1$ is reduced with increasing the value of $V\_x \overline{FP}$, that is, the value of $\beta(V\_xRP)_1$ is negatively correlated with the value of $V\_x \overline{FP}$. The above formula may be used for calculating the uplink transmission power of the terminal.

Figure 4:
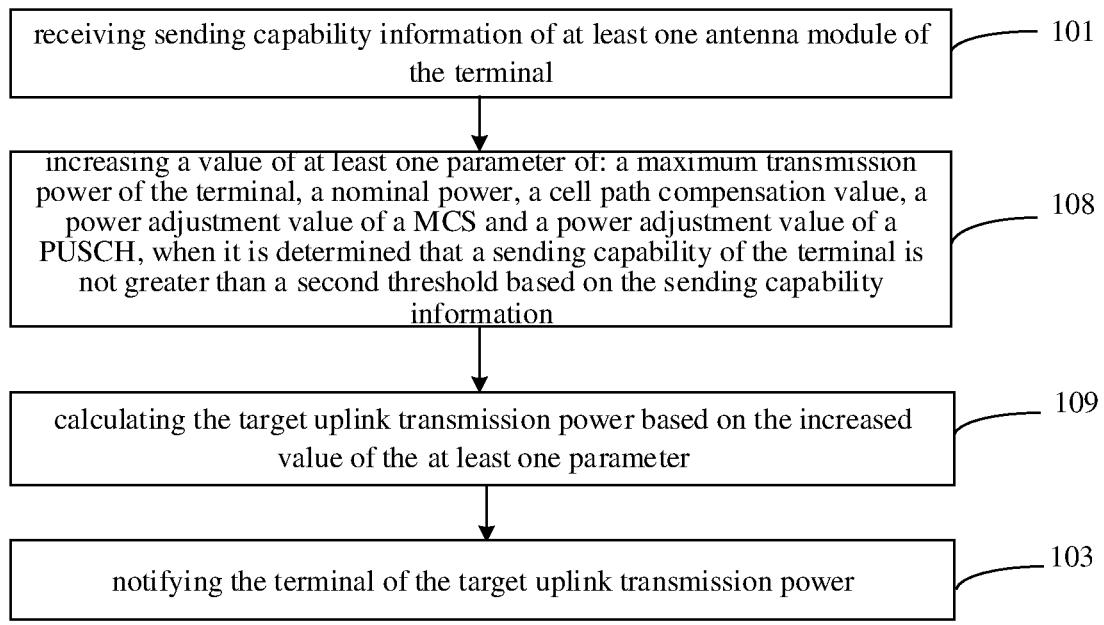
FIG. 4 is a flow chart illustrating a method for adjusting an uplink transmission power of a terminal according to an exemplary embodiment of the present disclosure.

FIG. 4 is a flow chart illustrating a method for adjusting an uplink transmission power of a terminal according to an exemplary embodiment of the present disclosure. As illustrated in FIG. 4, in the method, obtaining the target uplink transmission power of the terminal based on the sending capability information of the at least one antenna module of the terminal may include steps 108 and 109. At step 108, a value of at least one parameter of: a maximum transmission power of the terminal, a nominal power, a cell path compensation value, a power adjustment value of a MCS and a power adjustment value of a PUSCH is increased, when it is determined that a sending capability of the terminal is not greater than a second threshold based on the sending capability information. Any one of the above parameters may be increased by, such as, adding a preset value to the parameter, or multiplying the parameter by a preset coefficient greater than 1. The second threshold value may be equal to or lower than the first threshold value. The second threshold value may be set by an operator, or may be set by the base station based on a network layout situation of a certain network coverage area. Increasing the cell path compensation value $\alpha(j)$ is taken as an example, and the increased value of $\alpha(j)$ is) α(j)+Δα(j)(V_x$FP$). V_x$FP$ represents a value of the sending capability of the at least one antenna module of the terminal. For example, V_x$FP$ may be any one of the peak value of the EIR, the average value of the EIRP, the minimum value of the EIRP, the average value of the TRP, and the minimum value of the TRP. The greater the value of V_x$FP$, the stronger the sending capability of the terminal is. A value of Δα(j)(V_x$FP$) may be reduced with increasing the value of V_x$FP$, that is, the value of Δα(j)(V_x$FP$) is negatively correlated with the value of V_x$FP$. The increased value of α(j) may also be α(j)×βa(j)(V_x$FP$). A value of βα(j)(V_x$FP$) may be reduced with increasing the value of V_x$FP$, that is, the value of βα(j)(V_x$FP$) is negatively correlated with the value of V_x$FP$. At step 109, the target uplink transmission power is calculated based on the at least one increased parameter. For example, the target uplink transmission power may be obtained by substituting the increased value of at least one parameter into the above formula.

Figure 5:
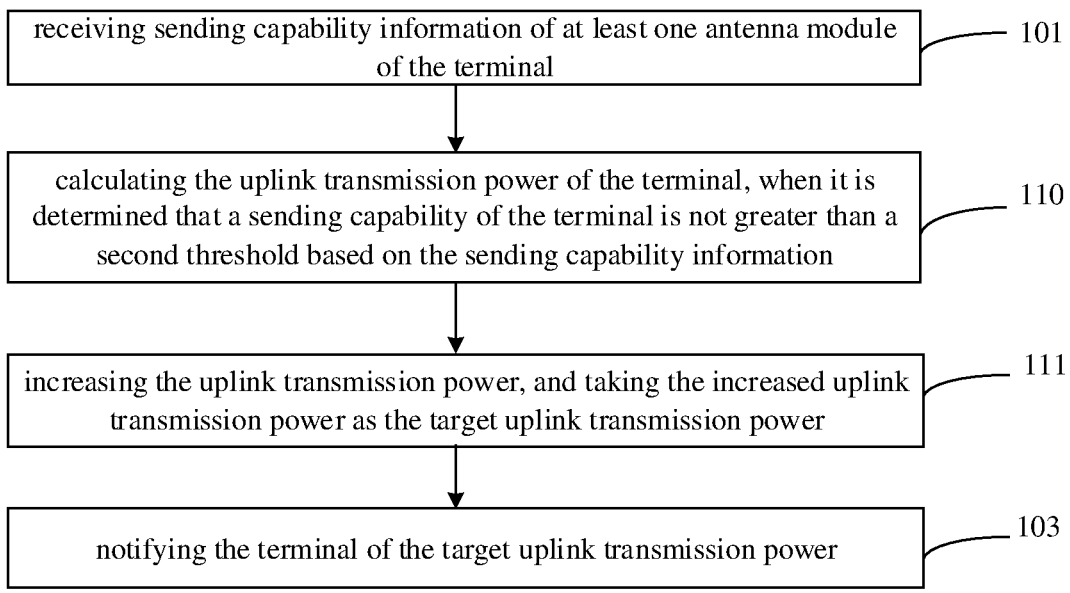
FIG. 5 is a flow chart illustrating a method for adjusting an uplink transmission power of a terminal according to an exemplary embodiment of the present disclosure.

FIG. 5 is a flow chart illustrating a method for adjusting an uplink transmission power of a terminal according to an exemplary embodiment of the present disclosure. As illustrated in FIG. 5, in the method, obtaining the target uplink transmission power of the terminal based on the sending capability information of the at least one antenna module of the terminal may include: at step 110, calculating the uplink transmission power of the terminal, when it is determined that a sending capability of the terminal is not greater than a second threshold based on the sending capability information; and increasing the uplink transmission power, and at step 111, taking the increased uplink transmission power as the target uplink transmission power. The increased uplink transmission power may be obtained by adding the calculated uplink transmission power by a preset value, or multiplying the calculated uplink power value by a preset coefficient greater than 1. For example, the uplink transmission power $P_{PUSCH}(i)$ of the terminal may be increased to $P_{PUSCH}(i)-\Delta(V\_xRP)_2$ or $P_{PUSCH}(i)\times\beta(V\_xRP)_2$ by adjusting a factor $\Delta(V\_xRP)_2$ or a factor $\beta(V\_xRP)_2$. A value of $\Delta(V\_xRP)_2$ may be reduced with increasing the value of V_x$FP$, that is, the value of $\Delta(V\_xRP)_2$ is negatively correlated with the value of V_x$FP$. A value of $\beta(V\_xRP)_2$ may be reduced with increasing the value of V_x$FP$, that is, the value of $\beta(V\_xRP)_2$ is negatively correlated with the value of V_x$FP$. The above formula may be used for calculating the uplink transmission power of the terminal.

In a possible implementation, the sending capability information of the at least one antenna module received by the base station is sent by the terminal via one of a radio resource control (RRC) signaling, a media access control (MAC) control element (CE) signaling or a physical layer signaling. A delay of the RRC signaling may reach 200 ms. A delay of the MAC CE signaling may reach tens of milliseconds. A delay of the physical layer signaling is usually within 10 ms. It may be seen that the RRC signaling has the largest delay, and the physical layer signaling has the smallest delay, but a delay overhead of the physical layer signaling is larger. Therefore, the terminal may select one of the three signalings to perform sending based on an actual requirement when sending the sending capability information of the at least one antenna module to the base station.

Figure 6:
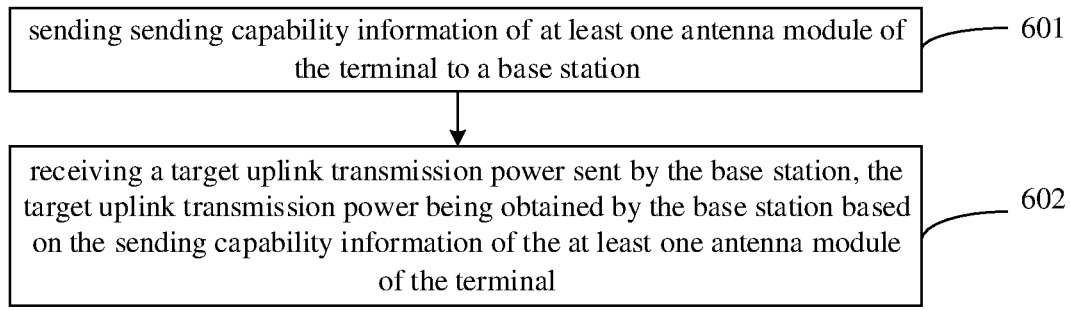
FIG. 6 is a flow chart illustrating a method for adjusting an uplink transmission power of a terminal according to an exemplary embodiment of the present disclosure.

FIG. 6 is a flow chart illustrating a method for adjusting an uplink transmission power of a terminal according to an exemplary embodiment of the present disclosure. The method is applied to the terminal. That is, the method may be executed by the terminal. As illustrated in FIG. 6, the method includes the following.

At step 601, sending capability information of at least one antenna module of the terminal is sent to a base station.

In a possible implementation, the terminal may send the sending capability information of the at least one antenna module of the terminal to the base station every time the terminal is initialized, for example, every time the terminal is turned on.

In a possible implementation, the terminal may send the sending capability information of the at least one antenna module to the terminal via the RRC signaling, the MAC CE signaling or the physical layer signaling.

At step 602, a target uplink transmission power sent by the base station is received. The target uplink transmission power is obtained by the base station based on the sending capability information.

In a possible implementation, the terminal may transmit an uplink signal with the target uplink transmission power after receiving the target uplink transmission power sent by the base station.

In a possible implementation, the terminal may have multiple physical antenna modules. The at least one antenna module of the terminal may include a certain physical antenna module in the terminal, a virtual antenna module simulated by at least two physical antenna modules in the terminal, or an antenna module in the antenna module combination of the terminal. The terminal may send an identifier of the physical antenna module, an identifier of the virtual antenna module or an identifier of the antenna module combination simultaneously to the base station when sending the sending capability information of the at least one antenna module to the base station. The antenna module combination may include at least two physical antenna modules or at least two virtual antenna modules.

In a possible implementation, the terminal may also send an identifier of the terminal to the base station simultaneously when sending the sending capability information of the antenna module to the base station, such that the base station may know the terminal to which the antenna module belongs.

In a possible implementation, the terminal may send the sending capability information of the at least one antenna module of the terminal to the base station via the RRC signaling, the MAC CE signaling or the physical layer signaling.

With the method for adjusting the uplink transmission power of the terminal of this embodiment, the terminal sends the sending capability information of the at least one antenna module of the terminal to the base station, such that the base station may determine the target uplink transmission power of the terminal based on the sending capability information. The terminal of the target uplink transmission power is notified, such that the terminal transmits the signal with the target uplink transmission power. In this way, the purpose of controlling the uplink transmission power of the terminal is implemented based on the actual sending capability of the terminal, the data transmission efficiency of the terminal is improved, or the power consumption of the terminal is saved on the premise of ensuring the data transmission efficiency of the terminal.

In a possible implementation, the sending capability information sent by the at least one antenna module to the base station includes at least one of: a peak value of an EIRP, an average value of the EIRP, a minimum value of the EIRP, an average value of a TRP, and a minimum value of the TRP. For example, the sending capability indexes of the antenna module of the terminal may be preset on the terminal before leaving the factory. The terminal may send the at least one sending capability index of the antenna module to the base station when sending the sending capability information of the at least one antenna module of the terminal to the base station. For example, the sending capability information of at least one antenna module sent by the terminal to the base station may include an identifier of the antenna module, an identifier of the sending capability index and a value corresponding to the sending capability index, or may include an identifier of the antenna module combination, the identifier of the sending capability index and the value corresponding to the sending capability index.

Figure 7:
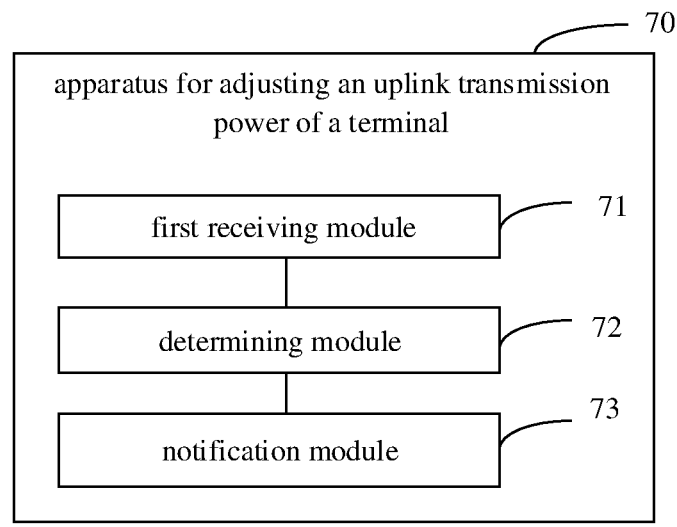
FIG. 7 is a block diagram illustrating an apparatus for adjusting an uplink transmission power of a terminal according to an exemplary embodiment of the present disclosure.

FIG. 7 is a block diagram illustrating an apparatus for adjusting an uplink transmission power of a terminal according to an exemplary embodiment of the present disclosure. As illustrated in FIG. 7, the apparatus 70 includes a first receiving module 71, a determining module 72, and a notification module 73. The first receiving module 71 is configured to receive sending capability information of at least one antenna module of the terminal. The determining module 72 is configured to obtain a target uplink transmission power of the terminal based on the sending capability information. The notification module 73 is configured to notify the terminal of the target uplink transmission power.

Figure 8:
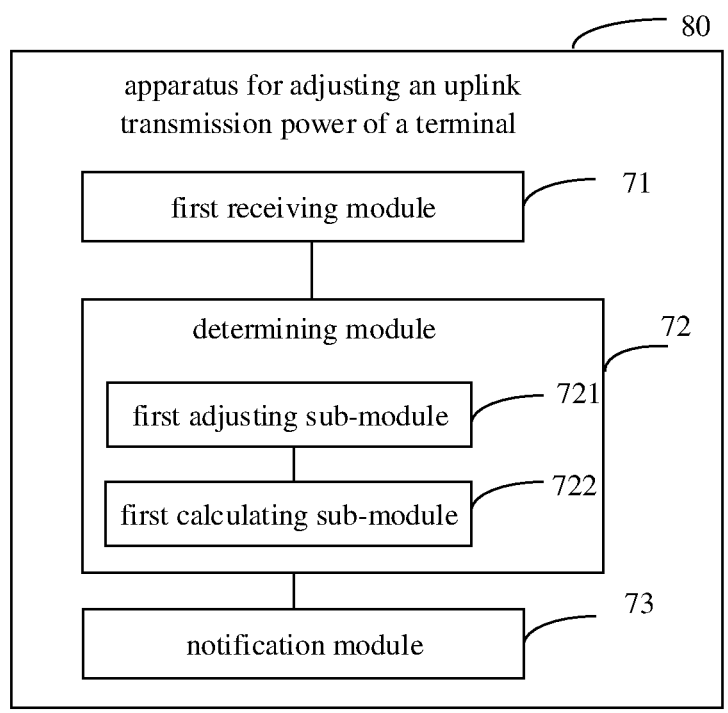
FIG. 8 is a block diagram illustrating an apparatus for adjusting an uplink transmission power of a terminal according to an exemplary embodiment of the present disclosure.

FIG. 8 is a block diagram illustrating an apparatus for adjusting an uplink transmission power of a terminal according to an exemplary embodiment of the present disclosure. As illustrated in FIG. 8, in the apparatus 80, the determining module 72 includes: a first adjusting sub-module 721 and a first calculating sub-module 722. The first adjusting sub-module 721 is configured to reduce a value of at least one parameter of: a maximum transmission power, a nominal power, a cell path compensation value, a power adjustment value of a MCS and a power adjustment value of a PUSCH of the terminal, when it is determined that a sending capability of the terminal is not lower than a first threshold based on the sending capability information. The first calculating sub-module 722 is configured to calculate the target uplink transmission power based on the reduced value of the at least one parameter.

Figure 9:
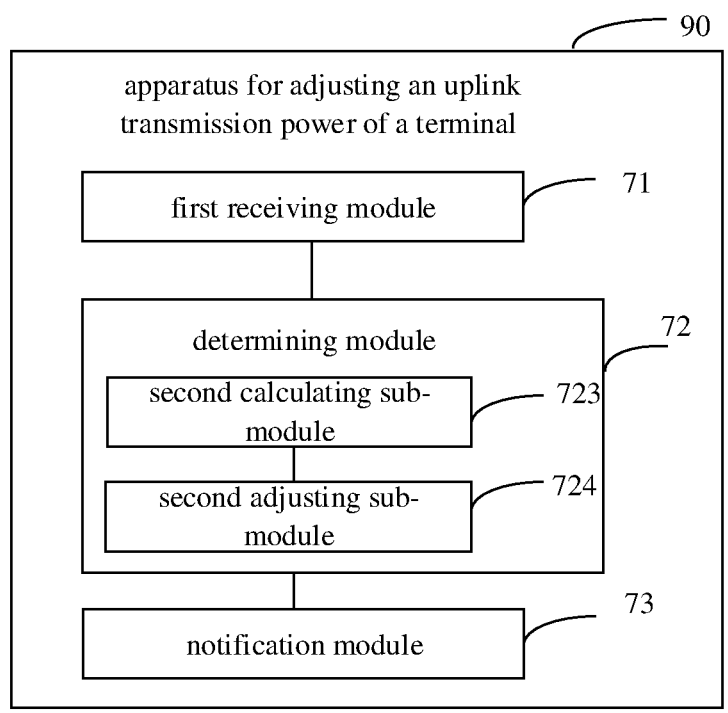
FIG. 9 is a block diagram illustrating an apparatus for adjusting an uplink transmission power of a terminal according to an exemplary embodiment of the present disclosure.

FIG. 9 is a block diagram illustrating an apparatus for adjusting an uplink transmission power of a terminal according to an exemplary embodiment of the present disclosure. As illustrated in FIG. 9, in the apparatus 90, the determining module 72 may include: a second calculating sub-module 723 and a second adjusting sub-module 724. The second calculating sub-module 723 is configured to calculate the uplink transmission power of the terminal, when it is determined that a sending capability of the terminal is not lower than a first threshold based on the sending capability information. The second adjusting sub-module 724 is configured to reduce the uplink transmission power, and to take the reduced uplink transmission power as the target uplink transmission power.

Figure 10:
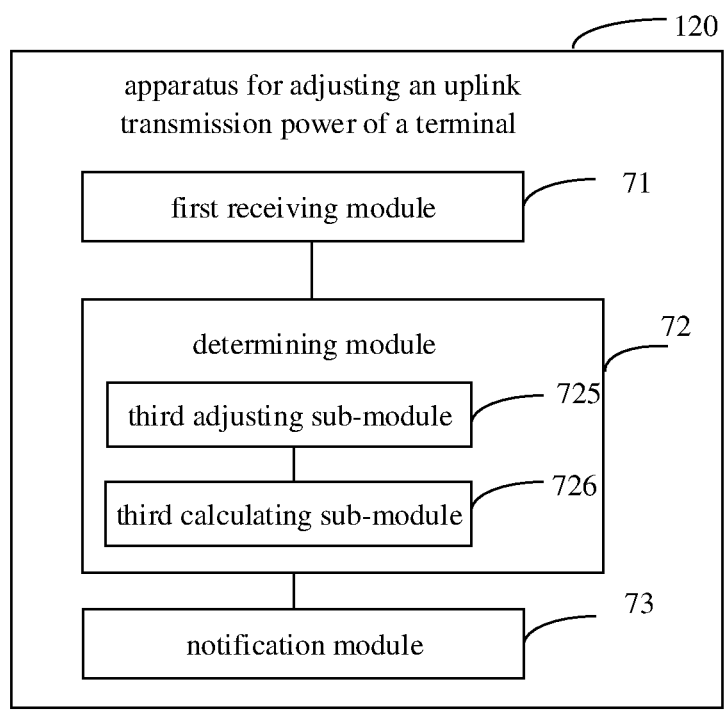
FIG. 10 is a block diagram illustrating an apparatus for adjusting an uplink transmission power of a terminal according to an exemplary embodiment of the present disclosure.

FIG. 10 is a block diagram illustrating an apparatus for adjusting an uplink transmission power of a terminal according to an exemplary embodiment of the present disclosure. As illustrated in FIG. 10, in the apparatus 120, the determining module 72 may include: a third adjusting sub-module 725, and a third calculating sub-module 726. The third adjusting sub-module 725 is configured to increase a value of at least one parameter of: a maximum transmission power of the terminal, a nominal power, a cell path compensation value, a power adjustment value of a MCS and a power adjustment value of a PUSCH, when it is determined that a sending capability of the terminal is not greater than a second threshold based on the sending capability information. The third calculating sub-module 726 is configured to calculate the target uplink transmission power based on the increased value of the at least one parameter.

Figure 11:
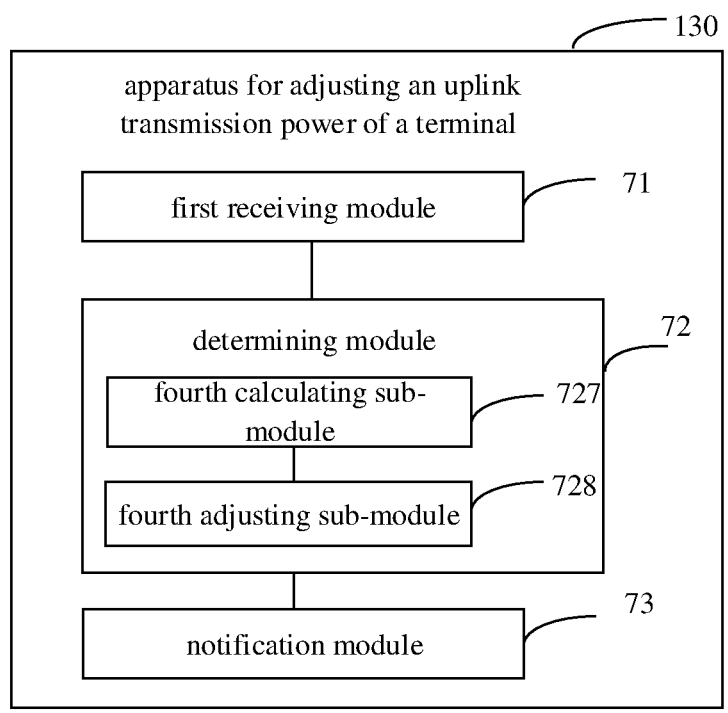
FIG. 11 is a block diagram illustrating an apparatus for adjusting an uplink transmission power of a terminal according to an exemplary embodiment of the present disclosure.

FIG. 11 is a block diagram illustrating an apparatus for adjusting an uplink transmission power of a terminal according to an exemplary embodiment of the present disclosure. As illustrated in FIG. 11, in the apparatus 130, the determining module 72 may include: a fourth calculating sub-module 727 and a fourth adjusting sub-module 728. The fourth calculating sub-module 727 is configured to calculate the uplink transmission power of the terminal, when it is determined that a sending capability of the terminal is not greater than a second threshold based on the sending capability information. The fourth adjusting sub-module 728 is configured to increase the uplink transmission power, and to take the increased uplink transmission power as the target uplink transmission power.

In a possible implementation, the sending capability information of the at least one antenna module of the terminal includes at least one of: a peak value of an EIRP, an average value of the EIRP, a minimum value of the EIRP, an average value of a TRP, and a minimum value of the TRP.

In a possible implementation, the sending capability information of the at least one antenna module of the terminal is sent by the terminal via one of an RRC signaling, a MAC CE signaling or a physical layer signaling.

Figure 12:
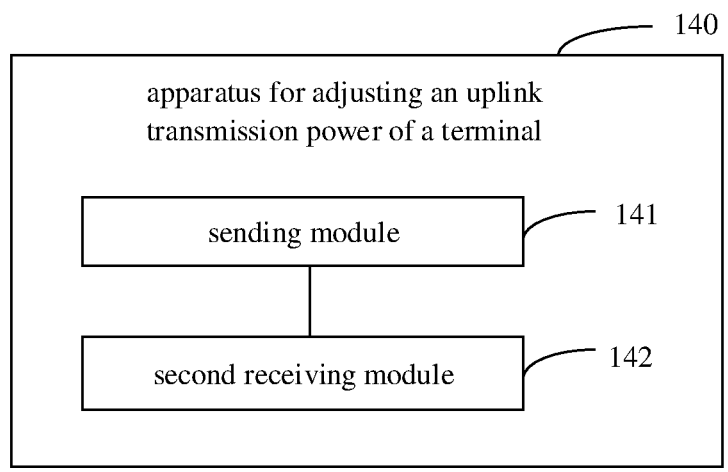
FIG. 12 is a block diagram illustrating an apparatus for adjusting an uplink transmission power of a terminal according to an exemplary embodiment of the present disclosure.

FIG. 12 is a block diagram illustrating an apparatus for adjusting an uplink transmission power of a terminal according to an exemplary embodiment of the present disclosure. As illustrated in FIG. 12, the apparatus 140 includes: a sending module 141 and a second receiving module 142. The sending module 141 is configured to send sending capability information of at least one antenna module of the terminal to a base station. The second receiving module 142 is configured to receive a target uplink transmission power sent by the base station. The target uplink transmission power is obtained by the base station based on the sending capability information.

In a possible implementation, the sending capability information of the at least one antenna module of the terminal includes at least one of: a peak value of an EIRP, an average value of the EIRP, a minimum value of the EIRP, an average value of a TRP, and a minimum value of the TRP.

In a possible implementation, the sending capability information of the at least one antenna module of the terminal may be sent by the terminal via at least one of: an RRC signaling, a MAC CE signaling or a physical layer signaling.

With regard to the apparatuses in the above embodiments, a detailed manner of each module performing operations is described in detail in embodiments related to the method, which is not elaborated here.

Figure 13:
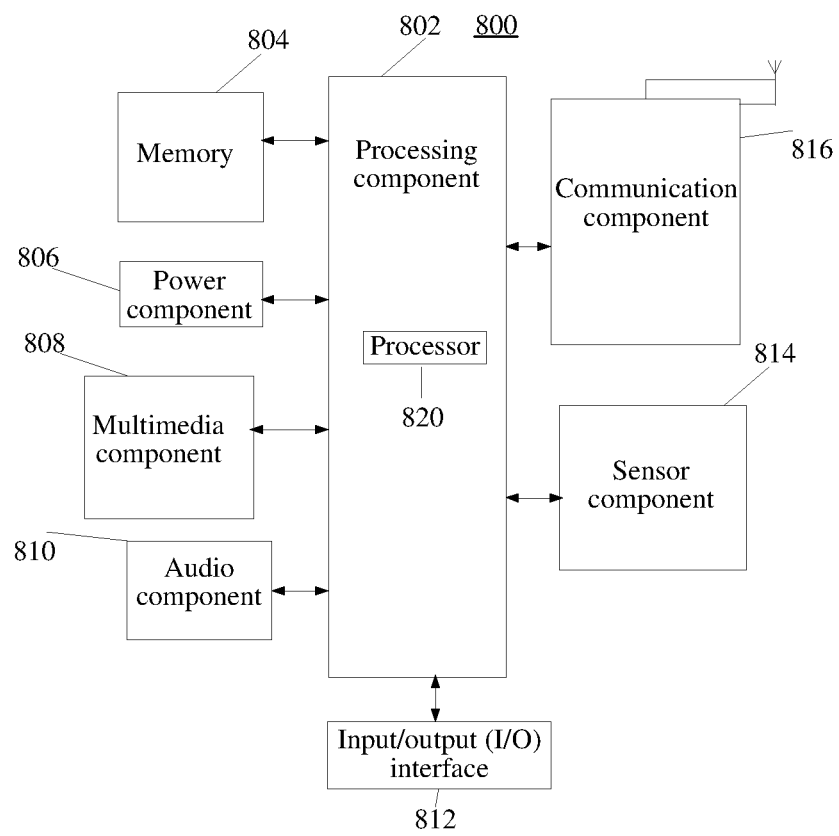
FIG. 13 is a block diagram illustrating a device for adjusting an uplink transmission power of a terminal according to an exemplary embodiment of the present disclosure.

FIG. 13 is a block diagram illustrating a device for adjusting an uplink transmission power of a terminal according to an exemplary embodiment of the present disclosure. For example, the device 800 may be a mobile phone, a computer, a digital broadcasting terminal, a message sending and receiving equipment, a game controller, a tablet device, a medical device, a fitness equipment, a personal digital assistant or the like.

As illustrated in FIG. 13, the device 800 may include one or more of: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 802 to execute instructions to perform all or part of the steps in the above described methods. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800 for performing the directional operation, contraction data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 is configured to provide power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as an adjustment mode or a video mode. Each of the front camera and the rear camera may be a fixed optical lens system or have focus and optical zoom capability.

The audio component 810 is configured to output and/or input audio signals. For example, the audio component 810 includes a microphone ("MIC") for receiving an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 is configured to provide an interface between the processing component 802 and peripheral interface modules, such as a keyboard, a click wheel, buttons, and the like. The buttons may include, but be not limited to, a home button, a volume button, a starting button, and a locking button.

The sensor component 814 includes one or more sensors to provide status assessments of various aspects of the device 800. For example, the sensor component 814 may detect an open/closed status of the device 800, relative positioning of components, e.g., the display and the keypad of the device 800, a change in position of the device 800 or a component of the device 800, a presence or absence of user contraction with the device 800, an orientation or an acceleration/deceleration of the device 800, and a change in temperature of the device 800. The sensor component 814 may include a proximity sensor for detecting the presence of nearby objects without any physical contact. The sensor component 814 may also include a light sensor, such as a CMOS (complementary metal-oxide-semiconductor)) or CCD (charge coupled device) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 may access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In an exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In one or more exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above methods.

In an exemplary embodiments, there is also provided a non-transitory computer readable storage medium including instructions, such as included in the memory 804, executed by the processor 820 in the device 800 for performing the above method. The non-transitory computer readable storage medium may be a ROM, a RAM, a CD-ROM, a magnetic tape, a floppy disc, an optical data storage device, and the like.

Figure 14:
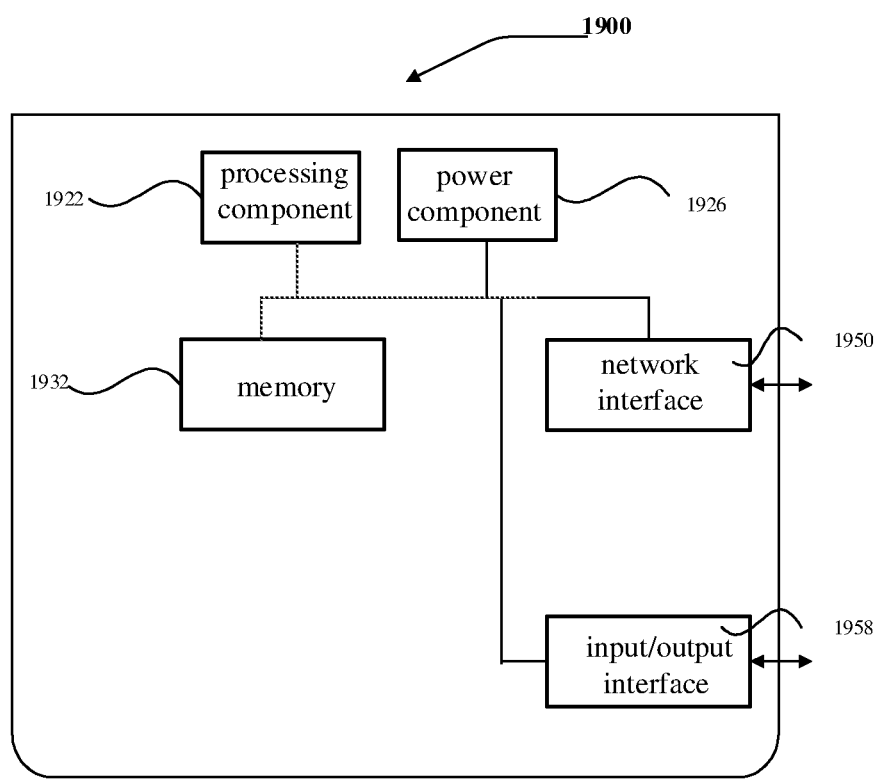
FIG. 14 is a block diagram illustrating a device for adjusting an uplink transmission power of a terminal according to an exemplary embodiment of the present disclosure.

FIG. 14 is a block diagram illustrating a device for adjusting an uplink transmission power of a terminal according to an exemplary embodiment of the present disclosure. For example, the device 1900 may be provided as a server. Referring to FIG. 14, the device 1900 includes a processing component 1922 and storage resources. The processing component 1922 further includes one or more processors. The storage resources are represented by a memory 1932, and configured to store instructions that may be executed by the processing component 1922. An application program stored in the memory 1932 may include one or more modules each corresponding to a set of instructions. In addition, the processing component 1922 is configured to execute instructions to execute the above method for adjusting the uplink transmission power of the terminal.

The device 1900 may further include a power component 1926 configured to perform power management of the device 1900, a wired or wireless network interface 1950 configured to connect the apparatus 1900 to a network, and an input/output (I/O) interface 1958. The device 1900 may be performed based on an operating system stored in the memory 1932, such as a Windows Server™, a Mac OS X™, a Unix™, a Linux™, a FreeBSD™ or the like.

In an exemplary embodiment, a non-transitory computer-readable storage medium including instructions is also provided, such as the memory 1932 including instructions. The instructions may be executed by the processing component 1922 of the device 1900 to perform the above method. For example, the non-temporary computer readable storage medium may be a ROM, a random access memory (RAM), a CD-ROM, a magnetic tape, a floppy disk, an optical data storage device, etc.

Other implementations of the present disclosure will be apparent to those skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It should be understood that the present disclosure is not limited to the exaction construction that has been described above and illustrated in the accompanying drawings, and that various modifications and changes may be made without departing from the scope thereof. The scope of the present disclosure only be limited by the appended claims.

What is claimed is:

1. A method for adjusting an uplink transmission power of a terminal, applied to a base station, the method comprising:
   receiving sending capability information of at least one antenna module of the terminal, wherein the sending capability information comprises at least one of: a peak value of an effective isotropic radiated power (EIRP), an average value of the EIRP, a minimum value of the EIRP, an average value of a total radiated power (TRP), or a minimum value of the TRP;
   determining a sending capability of the terminal based on a weighted sum of at least two sending capability indexes of the peak value of the EIRP, the average value of the EIRP, the minimum value of the EIRP, the average value of the TRP, or the minimum value of the TRP of the at least one antenna module of the terminal, wherein the weighted sum is obtained by superimposing a weight value on each of the at least two sending capability indexes, and summing the at least two sending capability indexes after superimposing the weight values;
   obtaining a target uplink transmission power of the terminal based on the determined sending capability of the terminal; and
   notifying the terminal of the target uplink transmission power;
   wherein obtaining the target uplink transmission power of the terminal based on the determined sending capability of the terminal comprises at least one of:
      reducing a value of at least one parameter of: a maximum transmission power, a nominal power, a cell path compensation value, a power adjustment value of a modulation and coding scheme (MCS) and a power adjustment value of a physical uplink shared channel (PUSCH) of the terminal, in response to determining that the sending capability of the terminal is not lower than a first threshold based on the sending capability information; and calculating the target uplink transmission power based on the reduced value of the at least one parameter;
      calculating the uplink transmission power of the terminal in response to determining that the sending capability of the terminal is not lower than the first threshold based on the sending capability information; and reducing the uplink transmission power, and taking the reduced uplink transmission power as the target uplink transmission power;
      increasing a value of at least one parameter of: a maximum transmission power of the terminal, a nominal power, a cell path compensation value, a power adjustment value of a MCS and a power adjustment value of a PUSCH, in response to determining that the sending capability of the terminal is not greater than a second threshold based on the sending capability information; and calculating the target uplink transmission power based on the increased value of the at least one parameter; or
      calculating the uplink transmission power of the terminal in response to determining that the sending capability of the terminal is not greater than the second threshold based on the sending capability information; and increasing the uplink transmission power, and taking the increased uplink transmission power as the target uplink transmission power.

2. The method of claim 1, wherein the sending capability information is sent by the terminal via one of a radio resource control (RRC) signaling, a media access control (MAC) control element (CE) signaling or a physical layer signaling.

3. A method for adjusting an uplink transmission power of a terminal, applied to the terminal, the method comprising:
   transmitting, to a base station, sending capability information of at least one antenna module of the terminal, wherein the sending capability information comprises at least one of: a peak value of an effective isotropic radiated power (EIRP), an average value of the EIRP, a minimum value of the EIRP, an average value of a total radiated power (TRP), or a minimum value of the TRP; and
   receiving a target uplink transmission power sent by the base station, the target uplink transmission power being obtained by the base station based on a sending capability of the terminal, wherein the sending capability of the terminal is determined based on a weighted sum of at least two sending capability indexes of the peak value of the EIRP, the average value of the EIRP, the minimum value of the EIRP, the average value of the TRP, or the minimum value of the TRP of the at least one antenna module of the terminal, wherein the weighted sum is obtained by superimposing a weight value on each of the at least two sending capability indexes, and summing the at least two sending capability indexes after superimposing the weight values;
   wherein the target uplink transmission power of the terminal being obtained by the base station based on the determined sending capability of the terminal comprises at least one of:
      reducing a value of at least one parameter of: a maximum transmission power, a nominal power, a cell path compensation value, a power adjustment value of a modulation and coding scheme (MCS) and a power adjustment value of a physical uplink shared channel (PUSCH) of the terminal, in response to determining that the sending capability of the terminal is not lower than a first threshold based on the sending capability information; and calculating the target uplink transmission power based on the reduced value of the at least one parameter;

calculating the uplink transmission power of the terminal in response to determining that the sending capability of the terminal is not lower than a first threshold based on the sending capability information; and reducing the uplink transmission power, and taking the reduced uplink transmission power as the target uplink transmission power;

increasing a value of at least one parameter of: a maximum transmission power of the terminal, a nominal power, a cell path compensation value, a power adjustment value of a MCS and a power adjustment value of a PUSCH, in response to determining that the sending capability of the terminal is not greater than a second threshold based on the sending capability information; and calculating the target uplink transmission power based on the increased value of the at least one parameter; or calculating the uplink transmission power of the terminal in response to determining that the sending capability of the terminal is not greater than the second threshold based on the sending capability information; and increasing the uplink transmission power, and taking the increased uplink transmission power as the target uplink transmission power.

4. The method of claim 3, wherein transmitting, to the base station, the sending capability information of the at least one antenna module of the terminal comprises:

transmitting the sending capability information via at least one of: a radio resource control (RRC) signaling, a media access control (MAC) control element (CE) signaling, or a physical layer signaling.

5. A base station, comprising:
a processor; and
a memory configured to store instructions executable by the processor,
wherein the processor is configured to perform the method of claim 1.

6. A terminal, comprising:
a processor; and
a memory configured to store instructions executable by the processor,
wherein the processor is configured to:
send, to a base station, sending capability information of at least one antenna module of the terminal, wherein the sending capability information comprises at least one of: a peak value of an effective isotropic radiated power (EIRP), an average value of the EIRP, a minimum value of the EIRP, an average value of a total radiated power (TRP), or a minimum value of the TRP; and
receive a target uplink transmission power sent by the base station, the target uplink transmission power being obtained by the base station based on a sending capability of the terminal, wherein the sending capability of the terminal is determined based on a weighted sum of at least two sending capability indexes of the peak value of the EIRP, the average value of the EIRP, the minimum value of the EIRP, the average value of the TRP, or the minimum value of the TRP of the at least one antenna module of the terminal, wherein the weighted sum is obtained by superimposing a weight value on each of the at least two sending capability indexes, and summing the at least two sending capability indexes after superimposing the weight values;

wherein the target uplink transmission power of the terminal being obtained by the base station based on the determined sending capability of the terminal comprises at least one of:

reducing a value of at least one parameter of: a maximum transmission power, a nominal power, a cell path compensation value, a power adjustment value of a modulation and coding scheme (MCS) and a power adjustment value of a physical uplink shared channel (PUSCH) of the terminal, in response to determining that the sending capability of the terminal is not lower than a first threshold based on the sending capability information; and calculating the target uplink transmission power based on the reduced value of the at least one parameter;

calculating the uplink transmission power of the terminal in response to determining that the sending capability of the terminal is not lower than a first threshold based on the sending capability information; and reducing the uplink transmission power, and taking the reduced uplink transmission power as the target uplink transmission power;

increasing a value of at least one parameter of: a maximum transmission power of the terminal, a nominal power, a cell path compensation value, a power adjustment value of a MCS and a power adjustment value of a PUSCH, in response to determining that the sending capability of the terminal is not greater than a second threshold based on the sending capability information; and calculating the target uplink transmission power based on the increased value of the at least one parameter; or calculating the uplink transmission power of the terminal in response to determining that the sending capability of the terminal is not greater than the second threshold based on the sending capability information; and increasing the uplink transmission power, and taking the increased uplink transmission power as the target uplink transmission power.

7. The terminal of claim 6, wherein in transmitting, to the base station, the sending capability information of the at least one antenna module of the terminal, the processor is further configured to:

transmit the sending capability information via at least one of: a radio resource control (RRC) signaling, a media access control (MAC) control element (CE) signaling, or a physical layer signaling.

8. The method of claim 1, wherein an uplink transmission power $P_{PUSCH}(i)$ of the terminal in i-th subframe on a PUSCH is obtained by:

$$P_{PUSCH}(i) = \min\{P_{CMAX}, 10\log_{10}(M_{PUSCH}(i)) + P_{O\_PUSCH}(j) + \alpha(j) \times PL + \Delta_{TF}(i) + f(i)\},$$

wherein, $P_{CMAX}$ represents the maximum transmission power of the terminal, $M_{PUSCH}(i)$ represents a number of resource blocks (RB) used in a PUSCH transmission in the i-th subframe, $P_{O\_PUSCH}(j) = P_{O\_NOMINAL\_PUSCH}(j)$ represents a semi-static setting power reference value, $P_{O\_NOMINAL\_PUSCH}(j)$ represents a cell-specific parameter, and is related to a cell covered by the antenna module of the terminal, $P_{O\_UE\_PUSCH(j)}$ represents a terminal-specific parameter, $P_{O\_NOMINAL\_PUSCH}(j)$ and $P_{O\_UE\_PUSCH(j)}$ are indicated by a high layer signaling, j is related to an upstream transmission data packet, $\alpha(j)$ represents a compensation amount of a path loss corresponding to the cell, PL represents a loss compensation value of an open loop path, $\Delta_{TF}(i)$ represents a power adjustment value based on the MCS, and f(i) represents an adjustment value of a current power control of the PUSCH.

9. The method of claim 8, wherein the uplink transmission power $P_{PUSCH}(i)$ of the terminal is reduced to $P_{PUSCH}(i)-\Delta(V\_xRP)_1$ or $P_{PUSCH}(i)\times\beta(V\_xRP)$ by adjusting a factor $\Delta(V\_xRP)_1$ or a factor $\beta(V\_xRP)_1$, or the uplink transmission power $P_{PUSCH}(i)$ of the terminal is increased to $P_{PUSCH}(i)-\Delta(V\_xRP)_2$ or $P_{PUSCH}(i)\times\beta(V\_xRP)_2$ by adjusting a factor $\Delta(V\_xRP)_2$ or a factor $\beta(V\_xRP)_2$.

10. The method of claim 3, wherein an uplink transmission power $P_{PUSCH}(i)$ of the terminal in i-th subframe on a PUSCH is obtained by:

$$P_{PUSCH}(i)=\min\{P_{CMAX}, 10\log_{10}(M_{PUSCH}(i))+P_{O\_PUSCH}(j)+\alpha(j)\times PL+\Delta_{TF}(i)+f(i)\}.$$

wherein, $P_{CMAX}$ represents the maximum transmission power of the terminal, $M_{PUSCH}(i)$ represents a number of resource blocks (RB) used in a PUSCH transmission in the i-th subframe, $P_{O\_PUSCH}(j)=P_{O\_NOMINAL\_PUSCH}(j)+P_{O\_UE\_PUSCH}(j)$ represents a semi-static setting power reference value, $P_{O\_NOMINAL\_PUSCH}(j)$ represents a cell-specific parameter, and is related to a cell covered by the antenna module of the terminal, $P_{O\_UE\_PUSCH}(j)$ represents a terminal-specific parameter, $P_{O\_NOMINAL\_PUSCH}(j)$ and $P_{O\_UE\_PUSCH}(j)$ are indicated by a high layer signaling, j is related to an upstream transmission data packet, α(j) represents a compensation amount of a path loss corresponding to the cell, PL represents a loss compensation value of an open loop path, $\Delta_{TF}(i)$ represents a power adjustment value based on the MCS, and f(i) represents an adjustment value of a current power control of the PUSCH.

11. The method of claim 10, wherein the uplink transmission power $P_{PUSCH}(i)$ of the terminal is reduced to $P_{PUSCH}(i)-\Delta(V\_xRP)_1$ or $P_{PUSCH}(i)\times\beta(V\_xRP)$ by adjusting a factor $\Delta(V\_xRP)_1$ or a factor $\beta(V\_xRP)_1$, or the uplink transmission power $P_{PUSCH}(i)$ of the terminal is increased to $P_{PUSCH}(i)-\Delta(V\_xRP)_2$ or $P_{PUSCH}(i)\times\beta(V\_xRP)_2$ by adjusting a factor $\Delta(V\_xRP)_2$ or a factor $\beta(V\_xRP)_2$.

12. The method of claim 6, wherein an uplink transmission power $P_{PUSCH}(i)$ of the terminal in i-th subframe on a PUSCH is obtained by:

$$P_{PUSCH}(i)=\min\{P_{CMAX}, 10\log_{10}(M_{PUSCH}(i))+P_{O\_PUSCH}(j)+\alpha(j)\times PL+\Delta_{TF}(i)+f(i)\}.$$

wherein, $P_{CMAX}$ represents the maximum transmission power of the terminal, $M_{PUSCH}(i)$ represents a number of resource blocks (RB) used in a PUSCH transmission in the i-th subframe, $P_{O\_PUSCH}(j)=P_{O\_NOMINAL\_PUSCH}(j)+P_{O\_UE\_PUSCH}(j)$ represents a semi-static setting power reference value, $P_{O\_NOMINAL\_PUSCH}(j)$ represents a cell-specific parameter, and is related to a cell covered by the antenna module of the terminal, $P_{O\_UE\_PUSCH(j)}$ represents a terminal-specific parameter, $P_{O\_NOMINAL\_PUSCH}(j)$ and $P_{O\_UE\_PUSCH(j)}$ are indicated by a high layer signaling, j is related to an upstream transmission data packet, α(j) represents a compensation amount of a path loss corresponding to the cell, PL represents a loss compensation value of an open loop path, $\Delta_{TF}(i)$ represents a power adjustment value based on the MCS, and f(i) represents an adjustment value of a current power control of the PUSCH.

13. The method of claim 12, wherein the uplink transmission power $P_{PUSCH}(i)$ of the terminal is reduced to $P_{PUSCH}(i)-\Delta(V\_xRP)_1$ or $P_{PUSCH}(i)\times\beta(V\_xRP)$ by adjusting a factor $\Delta(V\_xRP)_1$ or a factor $\beta(V\_xRP)_1$, or the uplink transmission power $P_{PUSCH}(i)$ of the terminal is increased to $P_{PUSCH}(i)-\Delta(V\_xRP)_2$ or $P_{PUSCH}(i)\times\beta(V\_xRP)_2$ by adjusting a factor $\Delta(V\_xRP)_2$ or a factor $\beta(V\_xRP)_2$.

* * * * *